(12) United States Patent
Yu (10) Patent No.: US 12,481,927 B2
(45) Date of Patent: Nov. 25, 2025

(54) INFORMATION PROCESSING METHOD AND APPARATUS

(71) Applicant: Beijing Volcano Engine Technology Co., Ltd., Beijing (CN)

(72) Inventor: Fan Yu, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/823,403

(22) Filed: Sep. 3, 2024

(65) Prior Publication Data

US 2025/0103969 A1    Mar. 27, 2025

(30) Foreign Application Priority Data

Sep. 21, 2023  (CN) .......................... 202311227704.8

(51) Int. Cl.
*G06N 20/20* (2019.01)

(52) U.S. Cl.
CPC .................... *G06N 20/20* (2019.01)

(58) Field of Classification Search
CPC ..................................................... G06N 20/20
USPC ........................................................... 706/12
See application file for complete search history.

(56) References Cited

U.S. PATENT DOCUMENTS

| | | | | |
|---|---|---|---|---|
| 11,526,756 | B1 * | 12/2022 | Arici ...................... | G06N 3/045 |
| 2022/0405504 | A1 * | 12/2022 | Malkiel ................ | G06V 30/418 |
| 2024/0161035 | A1 * | 5/2024 | Lyman ................... | G16H 10/20 |

FOREIGN PATENT DOCUMENTS

| | | |
|---|---|---|
| CN | 111967495 A | 11/2020 |
| CN | 112561000 A | 3/2021 |
| CN | 116777814 A | 9/2023 |

OTHER PUBLICATIONS

Chen, et al. "New Ideas and Trends in Deep Multimodal Content Understanding: a Review", Neurocomputing 426 (2021) 195-215, 2021 (Year: 2021).*
First Office Action for Chinese Application No. 202311227704.8, mailed Apr. 26, 2025, 13 pages.

* cited by examiner

*Primary Examiner* — Tsu-Chang Lee
(74) *Attorney, Agent, or Firm* — Alleman Hall & Tuttle LLP (57) ABSTRACT

The present application discloses an information processing method, including: acquiring data to be processed in a target field corresponding to a small sample; processing the data to be processed using an initial content understanding model to obtain a processing result, wherein the initial content understanding model includes a plurality of sub-models, each of the plurality of sub-models is obtained based on sample data in a plurality of other fields, each of the plurality of other fields is a field corresponding to a large sample, and the processing result includes a result of processing the data to be processed by each of the plurality of sub-models; and then, determining a final result of processing the data to be processed based on the result of processing the data to be processed by each sub-model and a weight of each sub-model.

15 Claims, 2 Drawing Sheets

INFORMATION PROCESSING METHOD AND APPARATUS

CROSS-REFERENCE TO RELATED APPLICATION(S)

This application claims priority to Chinese Application No. 202311227704.8 filed Sep. 21, 2023, the disclosure of which is incorporated herein by reference in its entirety.

FIELD

The present application relates to the field of data processing, and in particular to an information processing method and apparatus.

BACKGROUND

With the development of the computer technology, a machine learning algorithm may be used for training to obtain a machine learning model, and the processing of corresponding data is implemented by the machine learning model obtained by training. For example, in a data classification scenario, a classification model may be trained to classify data. As another example, in a regression prediction scenario, a regression model may be trained to predict a regression value of data.

However, the data processing effect of the machine learning model is directly affected by the scale of training samples for training the model, and if a machine learning model with a better data processing effect needs to be obtained by training, a large number of training samples are required.

However, in some scenarios, for example, in a field corresponding to a small sample, the number of samples capable of being used for training the machine learning model is relatively small, and correspondingly, it is difficult to obtain a machine learning model with a better data processing effect by using fewer training samples in the field corresponding to the small sample. Therefore, how to process data to be processed in the field corresponding to the small sample to obtain a better data processing effect is a problem to be solved at present.

SUMMARY

In order to solve or at least partially solve the above technical problems, embodiments of the present application provide an information processing method and apparatus.

In a first aspect, an embodiment of the present application provides an information processing method, including:
  acquiring data to be processed in a target field corresponding to a small sample;
  processing the data to be processed using a content understanding model to obtain a processing result, wherein the content understanding model includes a plurality of sub-models, each of the plurality of sub-models is obtained based on sample data in a plurality of other fields, and the processing result includes a result of processing the data to be processed by each of the plurality of sub-models, and each of the plurality of other fields is a field corresponding to a large sample; and
  determining a final result of processing the data to be processed based on the result of processing the data to be processed by each sub-model and a weight of each sub-model, wherein the weight of each sub-model is determined based on training sample data in the target field.

Optionally, the weight of each sub-model is determined by:
  acquiring the training sample data in the target field, and obtaining processing results of the training sample data based on the plurality of sub-models respectively; and
  determining weights of respective sub-models of the plurality of sub-models based on the processing results of the training sample data and a label of the training sample data.

Optionally, determining the weights of respective sub-models of the plurality of sub-models based on the processing result of the training sample data and the label of the training sample data includes:
  determining weight scores of respective sub-models based on a processing result obtained by processing the training sample data by each sub-model and the label of the training sample data; and
  performing a normalization processing on the weight scores of respective sub-models to obtain the weights of respective sub-models.

Optionally,
  in a case where the content understanding model is used for determining a type of the data to be processed, and the content understanding model is applicable to a two-classification scenario, the weight score of each sub-model includes a Kolmogorov-Smirnov index or an area under curve index;
  in a case where the content understanding model is used for determining the type of the data to be processed, and the content understanding model is applicable to a multi-classification scenario, the weight score of each sub-model includes an accuracy rate; and
  in a case where the content understanding model is applicable to a regression prediction scenario, the weight score of each sub-model includes a mean absolute error or a mean square error.

Optionally, the content understanding model is a random forest model constructed based on a random forest algorithm, the plurality of sub-models are decision trees, and the content understanding model is constructed by:
  acquiring the sample data, and determining a depth of each decision tree and a split point corresponding to each decision tree; and
  obtaining the random forest model based on the sample data, the depth of each decision tree, and the split point corresponding to each decision tree.

Optionally, the data to be processed includes at least one of the following:
  a text, an image or an audio.

In a second aspect, an embodiment of the present application provides an information processing apparatus, including:
  an acquisition unit, configured to acquire data to be processed in a target field corresponding to a small sample;
  a processing unit, configured to process the data to be processed using a content understanding model to obtain a processing result, wherein the content understanding model includes a plurality of sub-models, each of the plurality of sub-models is obtained based on sample data in a plurality of other fields, and the processing result includes a result of processing the data to be processed by each of the plurality of sub-models, and each of the plurality of other fields is a field corresponding to a large sample; and a determining unit, configured to determine a final result of processing the data to be processed based on the result of processing the data to be processed by each sub-model, and a weight of each sub-model, wherein the weight of each sub-model is determined based on training sample data in the target field.

Optionally, the weight of each sub-model is determined by:
  acquiring the training sample data in the target field, and obtaining processing results of the training sample data based on the plurality of sub-models respectively; and
  determining weights of respective sub-models of the plurality of sub-models based on the processing results of the training sample data and a label of the training sample data.

Optionally, determining the weights of respective sub-models of the plurality of sub-models based on the processing result of the training sample data and the label of the training sample data includes:
  determining weight scores of respective sub-models based on a processing result obtained by processing the training sample data by each sub-model and the label of the training sample data; and
  performing a normalization processing on the weight scores of respective sub-models to obtain the weights of respective sub-models.

Optionally,
  in a case where the content understanding model is used for determining the type of the data to be processed, and the content understanding model is applicable to a two-classification scenario, the weight score of each sub-model includes a Kolmogorov-Smirnov index or an area under curve index;
  in a case where the content understanding model is used for determining the type of the data to be processed, and the content understanding model is applicable to a multi-classification scenario, the weight score of each sub-model includes an accuracy rate; and
  in a case where the content understanding model is applicable to a regression prediction scenario, the weight score of each sub-model includes a mean absolute error or a mean square error.

Optionally, the content understanding model is a random forest model constructed based on a random forest algorithm, the plurality of sub-models are decision trees, and the content understanding model is constructed by:
  acquiring the sample data, and determining a depth of each decision tree and a split point corresponding to each decision tree; and
  obtaining the random forest model based on the sample data, the depth of each decision tree, and the split point corresponding to each decision tree.

Optionally, the data to be processed includes at least one of the following:
  a text, an image or an audio.

In a third aspect, an embodiment of the present application provides an electronic device, including a processor and a memory, wherein,
  the processor is configured to execute an instruction stored in the memory, so as to cause the device to execute the method in any one of the above first aspect.

In a fourth aspect, an embodiment of the present application provides a computer-readable storage medium, including an instruction, wherein the instruction instructs a device to execute the method in any one of the above first aspect.

In a fifth aspect, an embodiment of the present application provides a computer program product that, when running on a computer, causes the computer to execute the method in any one of the above first aspect.

Compared with the prior art, the embodiments of the present application have the following advantages:

An embodiment of the present application provides an information processing method, including: acquiring data to be processed in a target field corresponding to a small sample; processing the data to be processed using an initial content understanding model to obtain a processing result, wherein the initial content understanding model includes a plurality of sub-models, each of the plurality of sub-models is obtained based on sample data in a plurality of other fields, the each of the plurality of other fields is a field corresponding to a large sample, the processing result includes a result of processing the data to be processed by each of the plurality of sub-models; and then determining a final result of processing the data to be processed based on the result of processing the data to be processed by each sub-model and a weight of each sub-model. In the embodiments of the present application, after the initial content understanding model is acquired based on the sample data in the field corresponding to a large sample, there is no need to train a new target model applicable to the target field based on the initial content understanding model, but the initial content understanding model is directly used as a model applicable to the target field, and when the data to be processed in the target field is processed, the foregoing final result may be obtained in combination with the initial content understanding model and the weight of each sub-model in the initial content understanding model. Since the initial content understanding model is obtained based on the sample data in a plurality of other fields corresponding to a large sample, the initial content understanding model has a certain data processing capability, and the weight of each sub-model is determined based on the training sample data in the target field, so that the foregoing final result is determined based on the initial content understanding model and the weight of each sub-model, and the data processing capability of the initial content understanding model can be transferred to data processing in the target field, so that the accuracy rate of the determined final result is also higher.

BRIEF DESCRIPTION OF THE DRAWINGS

To illustrate technical solutions in the embodiments of the present application or in the prior art more clearly, a brief introduction on the drawings which are needed in the description of the embodiments or the prior art is given below. Apparently, the drawings in the description below are merely some of the embodiments of the present application, based on which other drawings may be obtained by those ordinary skilled in the art without any creative effort.

DETAILED DESCRIPTION OF EMBODIMENTS

In order to enable those skilled in the art to better understand the solutions of the present application, a clear and complete description of the technical solutions in the embodiments of the present application will be given below, in combination with the drawings in the embodiments of the present application. Apparently, the embodiments described below are merely a part, but not all, of the embodiments of the present application. All of other embodiments, obtained by those ordinary skilled in the art based on the embodiments in the present application without any creative effort, fall into the protection scope of the present application.

By means of researches, the inventor of the present application discovers that in a field corresponding to a small sample, the number of samples capable of being used for training a machine learning model is relatively small. At present, in order to obtain a machine learning model that is applied to the field corresponding to the small sample and has a better data processing effect, a transfer learning manner may be used. Specifically, a pre-training model may be trained by using a large-scale data set, wherein the large-scale data set may be a data set in one or more other fields corresponding to a large sample other than the field corresponding to the small sample. Then, based on the pre-training model, the small sample is used for training a target model applied to the field corresponding to the small sample, and the target model is used for processing data in the field corresponding to the small sample. Specifically, during specific implementation of training the target model, one or more fully-connected layers may be added behind the pre-training model, and a parameter of the fully-connected layer is updated based on the small sample, so as to obtain the target model. However, multiple rounds of iterations are required to determine the parameter of the fully-connected layer, so that the frequency is lower.

In view of this, embodiments of the present application provide an information processing method and apparatus.

Various non-restrictive embodiments of the present application are described in detail below in combination with the drawings.

Exemplary Method

Figure 1:
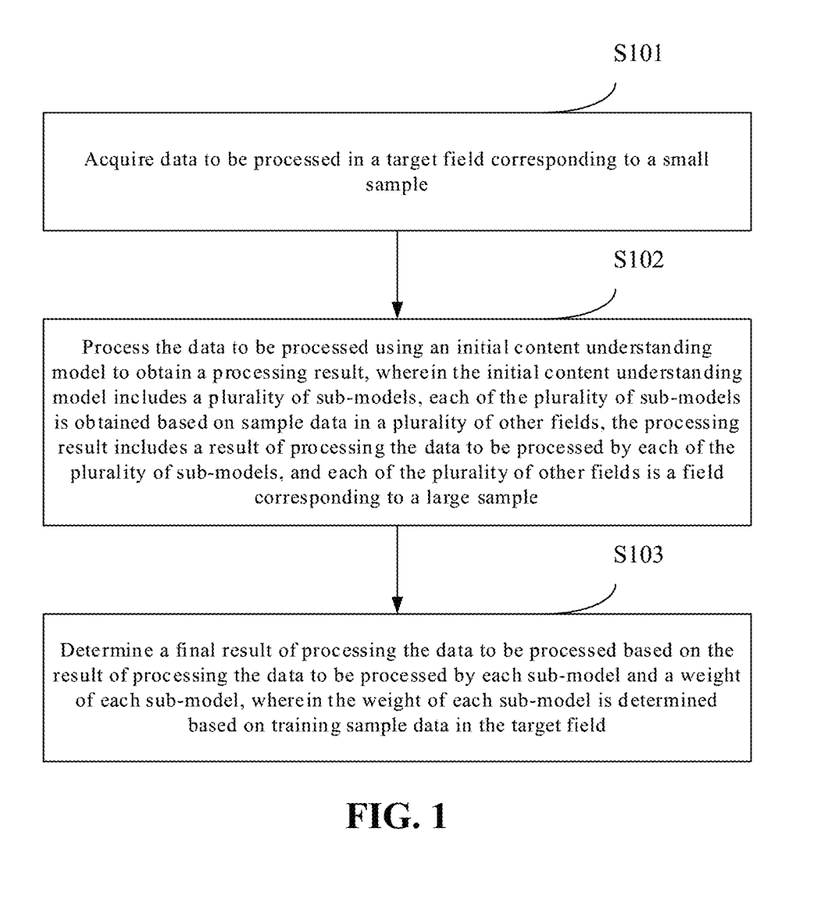
FIG. 1 is a schematic flowchart of an information processing method provided in an embodiment of the present application.

Referring to FIG. 1, it is a schematic flowchart of an information processing method provided in an embodiment of the present application. The information processing method provided in the embodiment of the present application may be executed by a client and may also be executed by a server, which is not specifically limited in the embodiments of the present application.

In the present embodiment, the method may include, for example, the following steps: S101 to S103.

S101: acquiring data to be processed in a target field corresponding to a small sample.

The target field is not specifically limited in the embodiments of the present application, and the target field may be determined according to actual situations. During specific implementation of S101, the data to be processed sent by other objects may be received, and the data to be processed may also be actively acquired, for example, the data to be processed is actively read from a corresponding database, which is not specifically limited in the embodiments of the present application.

The data to be processed is not specifically limited in the embodiments of the present application. The data to be processed may include at least one of a text, an image, or an audio. In one example, when the data to be processed is a text, the data to be processed may be, for example, an article; and when the data to be processed is an image, the data to be processed may be, for example, a video including a plurality of video frames. When the data to be processed is an audio, the data to be processed may be, for example, a music.

S102: processing the data to be processed using an initial content understanding model to obtain a processing result, wherein the initial content understanding model includes a plurality of sub-models, each of the plurality of sub-models is obtained based on sample data in a plurality of other fields, and the processing result includes a result of processing the data to be processed by each of the plurality of sub-models, and each of the plurality of other fields is a field corresponding to a large sample.

In the embodiments of the present application, after the data to be processed is acquired, the data to be processed may be processed using the initial content understanding model. As described above, the data to be processed may include at least one of the text, the image, or the audio. In one example, the initial content understanding model may be a classification model, which may be used for processing a category to which the data to be processed belongs, and in this case, the initial content understanding model may be applicable to a two-classification scenario, or applicable to a multi-classification scenario, which is not specifically limited in the embodiments of the present application. In another example, the initial content understanding model may be a regression prediction model, which is used for predicting a regression prediction value corresponding to the data to be processed. For example, the data to be processed is an audio, and the regression prediction value of processing the audio by the initial content understanding model may be a probability value of the audio being a minority-language voice.

In the embodiments of the present application, the initial content understanding model may include a plurality of sub-models. When the data to be processed is processed, the plurality of sub-models may respectively process the data to be processed, and correspondingly, each sub-model processes the data to be processed to obtain a processing result. Therefore, after the data to be processed is processed using the initial content understanding model, the obtained processing result may include the result of processing the data to be processed by each of the plurality of sub-models.

Each of the plurality of sub-models included in the initial content understanding model is obtained based on sample data in a plurality of other fields, wherein each of the other fields is a field corresponding to a large sample. In other words, the initial content understanding model is obtained by training based on a large-scale data set, therefore the initial content understanding model has a certain data processing capability. In one specific example, the other fields may be fields having certain correlation with the target field, so that the data processing capability of the initial content understanding model can be better transferred to data processing in the target field.

The initial content understanding model is not specifically limited in the embodiments of the present application. In one example, the initial content understanding model is a random forest model constructed based on a random forest algorithm, and correspondingly, when the initial content understanding model is a random forest model, the plurality of sub-models are decision trees (i.e., binary trees). In this case, the initial content understanding model may be constructed by the following steps A1-A2.

Step A1: acquiring the sample data, and determining a depth of each decision tree and a split point corresponding to each decision tree.

In one example, during specific implementation of the step A1, the depth of each decision tree and the split point corresponding to each decision tree may be obtained by reading a corresponding configuration file. In another example, the depth of each decision tree and the split point corresponding to each decision tree, which are input by a user, may be acquired by a human-computer interaction interface.

The depth of each decision tree and the split point corresponding to each decision tree are not specifically limited in the embodiments of the present application. In one example, the depth of each decision tree may be actually set according to actual situations. Regarding the split point used by each decision tree, a feature satisfying a requirement may be selected from a plurality of features included in the sample data. For example, an information gain or a Gini coefficient of the binary tree, which is obtained by using each feature as the split point, may be predetermined, and the split point used by the decision tree is determined based on the information gain or the Gini coefficient. For example, a feature with a higher information gain is determined as the split point of the decision tree.

Step A2: obtaining the random forest model based on the sample data, the depth of each decision tree, and the split point corresponding to each decision tree.

After the depth of each decision tree and the split point corresponding to each decision tree are determined, the sample data may be classified based on the depth of each decision tree and the split point corresponding to each decision tree, so as to obtain the plurality of decision trees mentioned above.

In one example, the sample data may be divided into a plurality of copies, and one copy is used for constructing one decision tree. In another example, each decision tree may be constructed by using complete sample data, which is not specifically limited in the embodiments of the present application.

Since the random forest model includes a plurality of decision trees, and the decision trees are essentially binary trees, the construction process of the binary trees is actually a process of classifying the data based on the split points to determine whether the data is located on a left sub-tree or a right sub-tree. Therefore, the construction process of the random forest model is very simple and efficient. As such, the random forest model is used as the initial content understanding model, and the efficiency of acquiring the initial content understanding model is very high.

In yet another example, the initial content understanding model may also be a support vector machine (SVM) model including a plurality of SVMs, or may be a logistic regression (LR) model including a plurality of sub-LR models, which is not specifically limited in the embodiments of the present application. The SVM model may be constructed by using a traditional SVM model construction method, and the LR model may also be constructed by using a traditional LR model construction manner, which is not specifically limited in the embodiments of the present application.

S103: determining a final result of processing the data to be processed based on the result of processing the data to be processed by each sub-model and a weight of each sub-model, wherein the weight of each sub-model is determined based on training sample data in the target field.

Considering that the initial content understanding model is obtained based on sample data in other fields, the result of processing the data to be processed by each sub-model cannot be used as the final result of processing the data to be processed. In the embodiments of the present application, in order to enable the initial content understanding model to be transferred into the target field, the weight of each sub-model may be determined in combination with the training sample data in the target field. Correspondingly, the final result of processing the data to be processed is determined according to the result of processing the data to be processed by each sub-model and the weight of each sub-model. For a certain sub-model, the weight of the sub-model may represent a degree of contribution that the sub-model may provide when processing the data to be processed in the target field. The higher the weight value is, the higher the degree of contribution of the sub-model for processing the data to be processed in the target field is.

For example, during specific implementation of S103, weighted summation may be performed the results of processing the data to be processed by respective sub-models based on the weights of respective sub-models, so as to obtain the final result of processing the data to be processed. For example, it is assumed that the initial content understanding model includes n sub-models, the result of processing the data to be processed by an i-th sub-model is $s_i$, the weight of the i-th sub-model is $w_i$, and the value of i may be an integer from 1 to n. Then, the final result of processing the data to be processed is: $w1*s1+w2*s2+w3*s3+ \ldots +wn*sn$.

As it can be seen from the above description, in the embodiments of the present application, after the initial content understanding model is acquired, there is no need to train a new target model applicable to the target field based on the initial content understanding model, but the initial content understanding model is directly used as a model applicable to the target field, and when the data to be processed in the target field is processed, the foregoing final result may be obtained in combination with the initial content understanding model and the weight of each sub-model in the initial content understanding model. Since the initial content understanding model is obtained based on the large-scale data set, the initial content understanding model has a certain data processing capability, and the weight of each sub-model is determined based on the training sample data in the target field, so that the foregoing final result is determined based on the initial content understanding model and the weight of each sub-model, and the data processing capability of the initial content understanding model can be transferred to data processing in the target field, so that the accuracy rate of the determined final result is also higher.

As described above, the weight of each sub-model is determined based on the training sample data in the target field. Next, the manner of determining the weight of each sub-model is described.

Figure 2:
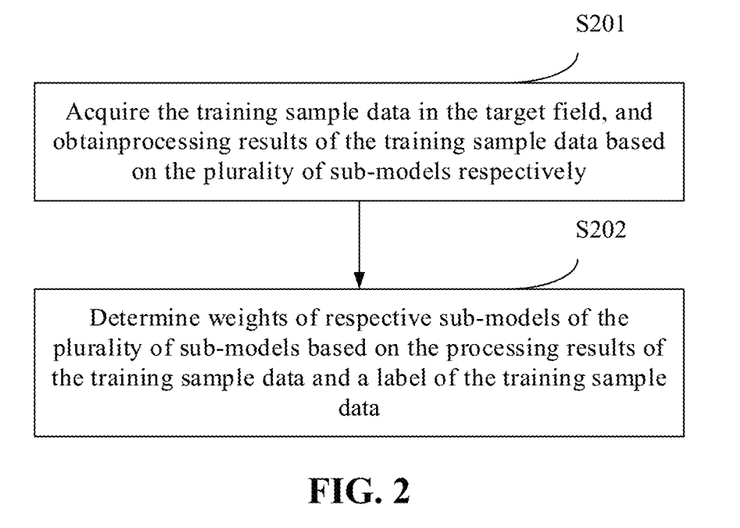
FIG. 2 is a schematic flowchart of a method for determining a weight of a sub-model provided in an embodiment of the present application.

In one example, the weight of each sub-model may be obtained by steps S201-S202 shown in FIG. 2, and FIG. 2 is a schematic flowchart of a method for determining a weight of a sub-model provided in an embodiment of the present application.

S201: acquiring the training sample data in the target field, and obtaining processing results of the training sample data based on the plurality of sub-models respectively.

During specific implementation of S201, a plurality of pieces of training sample data in the target field may be acquired, and each piece of training sample data is processed by using each sub-model of the plurality of sub-models, so as to obtain a processing result of each sub-model for each piece of training sample data. Regarding the processing result of each sub-model for each piece of training sample data, it is illustrated by using a processing result obtained by processing first training sample data by a first sub-model. The first sub-model is any one of the plurality of sub-models, and the first training sample data is any one of the plurality of pieces of training sample data.

In one example, in a case where the initial content understanding model is used for determining the type of the data to be processed and the initial content understanding model is applicable to a two-classification scenario, for example, the initial content understanding model is used for determining whether an article belongs to a first category, then a processing result obtained by processing the first training sample data by the first sub-model may be a probability value of belonging to the first category. For example, the processing result is 0.8, and a probability of the article, which corresponds to the first training sample data, belonging to the first category is 0.8.

In another example, in a case where the initial content understanding model is used for determining the type of the data to be processed and the initial content understanding model is applicable to a multi-classification scenario, for example, the initial content understanding model is used for processing a type to which a first resource belongs, then the processing result obtained by processing the first training sample data by the first sub-model may be probability values of the first resource belonging to respective types. For example, the first resource is a music, the types of the music include three types in total, that is, a type 1, a type 2 and a type 3, then the processing result obtained by processing the first training sample data by the first sub-model may be {0.2, 0.2, 0.6}, the probability of the first resource belonging to the type 1 is 0.2, the probability of the first resource belonging to the type 2 is 0.2, and the probability of the first resource belonging to the type 3 is 0.6.

In another example, in a case where the initial content understanding model is applicable to a regression prediction scenario, for example, the initial content understanding model is used for predicting a regression prediction value of a second resource, then the processing result obtained by processing the first training sample data by the first sub-model may be a probability value corresponding to the first resource, for example, the first training sample corresponds to an audio, the processing result obtained by processing the first training sample data by the first sub-model may be 0.8, and a probability of the audio being minority-language voice is 0.8.

S202: determining weights of respective sub-models of the plurality of sub-models based on the processing results of the training sample data and a label of the training sample data.

Since the label of the training sample data may be considered as a standard value of the processing result, whether the processing result of processing the training sample data by the sub-model is accurate may be determined according to the label of the training sample data and the processing result, therefore the weights of respective sub-models of the plurality of sub-models are determined according to the processing result of the training sample data and the label of the training sample data.

In one example, during specific implementation of S202, the accuracy rate of processing the data to be processed by the plurality of sub-models may be determined according to the processing result of the training sample data and the label of the training sample data, and then the weights of respective sub-models are determined according to the accuracy rate. For example, a normalization processing is performed on the accuracy rates of respective sub-models to obtain the weights of respective sub-models. The accuracy may be, for example, a ratio of the processing result and the training sample data matching the label in the plurality of pieces of training sample data.

In yet another example, during specific implementation, S202 may be implemented by the following steps B1-B2.

Step B1: determining weight scores of respective sub-models based on the processing result obtained by processing the training sample data by each sub-model and the label of the training sample data.

In the embodiments of the present application, the weight score of respective sub-model is a quantization of the weight of respective sub-model.

In one example, the weight score of respective sub-model may be the accuracy of processing the data to be processed by respective sub-model mentioned above.

In another example, the weight score of respective sub-model may be determined based on the function of the initial content understanding model. Specifically, in a case where the initial content understanding model is used for determining the type of the data to be processed and the initial content understanding model is applicable to the two-classification scenario, it is taken into consideration that a Kolmogorov-Smirnov (KS) index or an area under curve (AUC) index in the two-classification scenario may both reflect the processing effect of the model, therefore the weight score of respective sub-model may be the KS index or the AUC index. In a case where the initial content understanding model is used for determining the type of the data to be processed, and the initial content understanding model is applicable to a multi-classification scenario, it is taken into consideration that the accuracy rate in the multi-classification scenario may reflect the processing effect of the model, therefore in this case, the weight score of respective sub-model may be accuracy rate. In a case where the initial content understanding model is applicable to a regression prediction scenario, it is taken into consideration that in a regression prediction scenario, a mean absolute error (MAE) or a mean squared error (MSE) may reflect the processing effect of the model, therefore in this case, the weight score of respective sub-model includes the average absolute error or the mean square error.

Since the KS index, the AUC index, the MAE and the MSE are special terms in the field of machine learning, definitions and calculation manners of the indexes are not described in detail herein.

Step B2: performing a normalization processing on the weight scores of respective sub-models to obtain the weights of respective sub-models.

After the weight scores of respective sub-models are determined, the normalization processing may be performed on the weight scores of respective sub-models to obtain the weights of respective sub-models. Specifically, it is assumed that the initial content understanding model includes n sub-models, a weight score corresponding to an i-th sub-model is ai, and a weight corresponding to the i-th sub-model is ai/(a1+a2+ . . . +an), and the value of i may be an integer from 1 to n.

As can be seen from the description of S201 to S202, in the embodiments of the present application, the weight of each sub-model is determined based on the training sample data in the target field. Specifically, the training sample data in the target field may be acquired, and the processing result of the training sample data is obtained based on the plurality of sub-models respectively; and further, the weights of respective sub-models of the plurality of sub-models are determined based on the processing result of the training sample data and the label of the training sample data. The calculation amount for determining the weights of respective sub-models of the plurality of sub-models is relatively small and is much less than the calculation amount for training the parameter of the fully-connected layer in the prior art. In other words, the efficiency of determining the weights of respective sub-models based on S201 to S202 is also higher. Since the weights of respective sub-models are efficiently determined, the initial content understanding model may be used for processing the data to be processed more quickly. Therefore, compared with the prior art, the present solution may more efficiently determine a model capable of processing the data to be processed.

Exemplary Device

Based on the method provided in the above embodiments, an embodiment of the present application further provides an apparatus, and the apparatus is described below in combination with the drawings.

Figure 3:
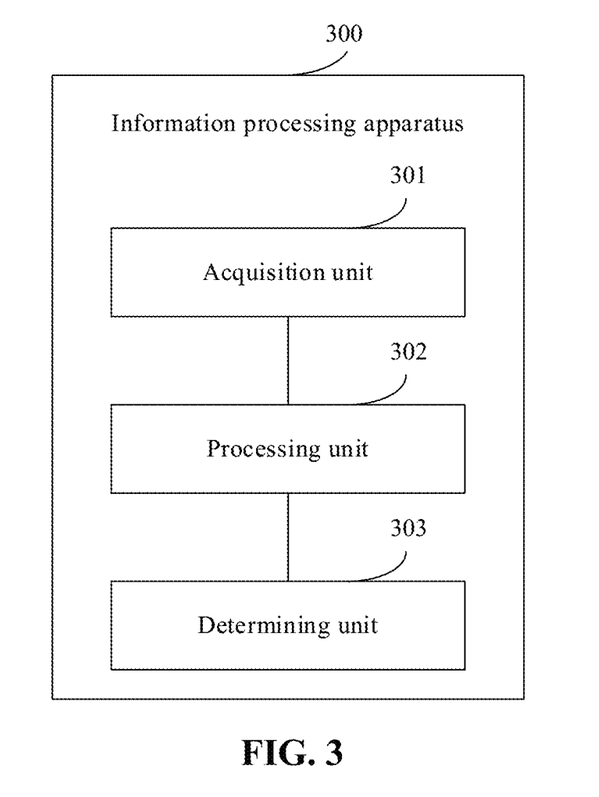
FIG. 3 is a schematic structural diagram of an information processing apparatus provided in an embodiment of the present application.

Referring to FIG. 3, it is a schematic structural diagram of an information processing apparatus provided in an embodiment of the present application. For example, the apparatus 300 may specifically include an acquisition unit 301, a processing unit 302 and a determining unit 303.

The acquisition unit 301 is configured to acquire data to be processed in a target field corresponding to a small sample.

The processing unit 302 is configured to process the data to be processed using a content understanding model to obtain a processing result, wherein the content understanding model includes a plurality of sub-models, each of the plurality of sub-models is obtained based on sample data in a plurality of other fields, and the processing result includes a result of processing the data to be processed by each of the plurality of sub-models, and each of the plurality of other fields is a field corresponding to a large sample.

The determining unit 303 is configured to determine a final result of processing the data to be processed based on the result of processing the data to be processed by each sub-model, and a weight of each sub-model, wherein the weight of each sub-model is determined based on training sample data in the target field.

Optionally, the weight of each sub-model is determined by:
  acquiring the training sample data in the target field, and obtaining processing results of the training sample data based on the plurality of sub-models respectively; and
  determining weights of respective sub-models of the plurality of sub-models based on the processing results of the training sample data and a label of the training sample data.

Optionally, determining the weights of respective sub-models of the plurality of sub-models based on the processing result of the training sample data and the label of the training sample data includes:
  determining weight scores of respective sub-models based on a processing result obtained by processing the training sample data by each sub-model and the label of the training sample data; and
  performing a normalization processing on the weight scores of respective sub-models to obtain the weights of respective sub-models.

Optionally, in a case where the content understanding model is used for determining the type of the data to be processed, and the content understanding model is applicable to a two-classification scenario, the weight score of each sub-model includes a Kolmogorov-Smirnov index or an area under curve index;

in a case where the content understanding model is used for determining the type of the data to be processed, and the content understanding model is applicable to a multi-classification scenario, the weight score of each sub-model includes an accuracy rate; or in a case where the content understanding model is applicable to a regression prediction scenario, the weight score of each sub-model includes a mean absolute error or a mean square error.

Optionally, the content understanding model is a random forest model constructed based on a random forest algorithm, the plurality of sub-models are decision trees, and the content understanding model is constructed by:
  acquiring the sample data, and determining a depth of each decision tree and a split point corresponding to each decision tree; and
  obtaining the random forest model based on the sample data, the depth of each decision tree, and the split point corresponding to each decision tree.

Optionally, the data to be processed includes at least one of the following:
  a text, an image or an audio.

Since the apparatus 300 is an apparatus corresponding to the information processing method provided in the above method embodiments, the specific implementations of the units of the apparatus 300 are the same concept as the above method embodiments, therefore, for the specific implementations of the units of the apparatus 300, reference may be made to related descriptions of the above method embodiments, and thus no repeated description will be given herein.

An embodiment of the present application further provides an electronic device, including a processor and a memory, wherein,
  the processor is configured to execute an instruction stored in the memory, so as to cause the device to execute the information processing method provided in the above method embodiments.

An embodiment of the present application provides a computer-readable storage medium, including an instruction, wherein the instruction instructs a device to execute the information processing method provided in the above method embodiments.

An embodiment of the present application further provides a computer program product that, when running on a computer, causes the computer to execute the information processing method provided in the above method embodiments.

After considering the specification and practicing the invention disclosed herein, those skilled in the art may easily think of other implementation solutions of the present application. The present application is intended to cover any variations, usages, or adaptive changes of the present application, and these variations, usages or adaptive changes follow general principles of the present application and include common knowledge or commonly used technical means in the present field that is not disclosed in the present disclosure. The specification and embodiments are considered as exemplary only, and the true scope and spirit of the present application are indicated in the following claims.

It should be understood that the present application is not limited to the precise structures that have been described above and shown in the drawings, and various modifications and changes may be made without departing from the scope thereof. The scope of the present application is limited only by the appended claims.

The above descriptions are only preferred embodiments of the present application and are not intended to limit the present application, and any modifications, equivalent replacements, improvements and the like, made within the spirit and principles of the present application, shall fall within the protection scope of the present application.

I claim:

1. A method of processing information through a machine learning model, the method being performed by a processor, and the method comprising:
   acquiring data to be processed in a target field corresponding to a small sample;
   processing the data to be processed using an initial content understanding model to obtain a processing result, wherein the initial content understanding model comprises a plurality of sub-models, each of the plurality of sub-models is a machine learning model trained based on sample data in a plurality of other fields, the processing result comprises a result of processing the data to be processed by each of the plurality of sub-models, and each of the plurality of other fields is a field corresponding to a large sample, wherein the initial content understanding model comprises a regression prediction model, the regression prediction model is used for predicting a regression prediction value corresponding to the data to be processed, the data to be processed comprises audio, and the regression prediction value of processing the audio by the initial content understanding model comprise a probability value of the audio being a minority-language voice; and
   determining a final result of processing the data to be processed based on the result of processing the data to be processed by each sub-model and a weight of each sub-model, wherein the weight of each sub-model is determined based on training sample data in the target field, wherein the final result of processing the data is used for a classification of at least one of a text, an image, or the audio, or for a prediction of a regression value of at least one of the text, the image, or the audio.

2. The method according to claim 1, wherein the weight of each sub-model is determined by:
   acquiring the training sample data in the target field, and obtaining processing results of the training sample data based on the plurality of sub-models respectively; and
   determining weights of respective sub-models of the plurality of sub-models based on the processing results of the training sample data and a label of the training sample data.

3. The method according to claim 2, wherein determining the weights of respective sub-models of the plurality of sub-models based on the processing result of the training sample data and the label of the training sample data comprises:
   determining weight scores of respective sub-models based on a processing result obtained by processing the training sample data by each sub-model and the label of the training sample data; and
   performing a normalization processing on the weight scores of respective sub-models to obtain the weights of respective sub-models.

4. The method according to claim 3, wherein, in a case where the initial content understanding model is used for determining a type of the data to be processed, and the initial content understanding model is applicable to a two-classification scenario, the weight score of each sub-model comprises a Kolmogorov-Smirnov index or an area under curve index;
   in a case where the initial content understanding model is used for determining the type of the data to be processed, and the initial content understanding model is applicable to a multi-classification scenario, the weight score of each sub-model comprise an accuracy rate; or
   in a case where the initial content understanding model is applicable to a regression prediction scenario, the weight score of each sub-model comprises a mean absolute error or a mean square error.

5. The method according to claim 1, wherein the initial content understanding model is a random forest model constructed based on a random forest algorithm, the plurality of sub-models are decision trees, and the initial content understanding model is constructed by:
   acquiring the sample data, and determining a depth of each decision tree and a split point corresponding to each decision tree; and
   obtaining the random forest model based on the sample data, the depth of each decision tree, and the split point corresponding to each decision tree.

6. An electronic device, comprising a processor and a memory, 7, wherein,
   the processor is configured to execute an instruction stored in the memory, so as to cause the device to:
   acquire data to be processed in a target field corresponding to a small sample;
   process the data to be processed using an initial content understanding model to obtain a processing result, wherein the initial content understanding model comprises a plurality of sub-models, each of the plurality of sub-models is a machine learning model trained based on sample data in a plurality of other fields, the processing result comprises a result of processing the data to be processed by each of the plurality of sub-models, and each of the plurality of other fields is a field corresponding to a large sample, wherein the initial content understanding model comprises a regression prediction model, the regression prediction model is used for predicting a regression prediction value corresponding to the data to be processed, the data to be processed comprises audio, and the regression prediction value of processing the audio by the initial content understanding model comprise a probability value of the audio being a minority-language voice; and
   determine a final result of processing the data to be processed based on the result of processing the data to be processed by each sub-model and a weight of each sub-model, wherein the weight of each sub-model is determined based on training sample data in the target field, wherein the final result of processing the data is used for a classification of at least one of a text, an image, or the audio, or for a prediction of a regression value of at least one of the text, the image, or the audio.

7. The electronic device according to claim 6, wherein the weight of each sub-model is determined by:
   acquiring the training sample data in the target field, and obtaining processing results of the training sample data based on the plurality of sub-models respectively; and determining weights of respective sub-models of the plurality of sub-models based on the processing results of the training sample data and a label of the training sample data.

8. The electronic device according to claim 7, wherein determining the weights of respective sub-models of the plurality of sub-models based on the processing result of the training sample data and the label of the training sample data comprises:
determining weight scores of respective sub-models based on a processing result obtained by processing the training sample data by each sub-model and the label of the training sample data; and
performing a normalization processing on the weight scores of respective sub-models to obtain the weights of respective sub-models.

9. The electronic device according to claim 8, wherein,
in a case where the initial content understanding model is used for determining a type of the data to be processed, and the initial content understanding model is applicable to a two-classification scenario, the weight score of each sub-model comprises a Kolmogorov-Smirnov index or an area under curve index;
in a case where the initial content understanding model is used for determining the type of the data to be processed, and the initial content understanding model is applicable to a multi-classification scenario, the weight score of each sub-model comprise an accuracy rate; or
in a case where the initial content understanding model is applicable to a regression prediction scenario, the weight score of each sub-model comprises a mean absolute error or a mean square error.

10. The electronic device according to claim 6, wherein the initial content understanding model is a random forest model constructed based on a random forest algorithm, the plurality of sub-models are decision trees, and the initial content understanding model is constructed by:
acquiring the sample data, and determining a depth of each decision tree and a split point corresponding to each decision tree; and
obtaining the random forest model based on the sample data, the depth of each decision tree, and the split point corresponding to each decision tree.

11. A non-transitory computer-readable storage medium, comprising an instruction, wherein the instruction instructs a device to:
acquire data to be processed in a target field corresponding to a small sample;
process the data to be processed using an initial content understanding model to obtain a processing result, wherein the initial content understanding model comprises a plurality of sub-models, each of the plurality of sub-models is a machine learning model trained based on sample data in a plurality of other fields, the processing result comprises a result of processing the data to be processed by each of the plurality of sub-models, and each of the plurality of other fields is a field corresponding to a large sample, wherein the initial content understanding model comprises a regression prediction model, the regression prediction model is used for predicting a regression prediction value corresponding to the data to be processed, the data to be processed comprises audio, and the regression prediction value of processing the audio by the initial content understanding model comprise a probability value of the audio being a minority-language voice; and
determine a final result of processing the data to be processed based on the result of processing the data to be processed by each sub-model and a weight of each sub-model, wherein the weight of each sub-model is determined based on training sample data in the target field, wherein the final result of processing the data is used for a classification of at least one of a text, an image, or the audio, or for a prediction of a regression value of at least one of the text, the image, or the audio.

12. The non-transitory computer-readable storage medium according to claim 11, wherein the weight of each sub-model is determined by:
acquiring the training sample data in the target field, and obtaining processing results of the training sample data based on the plurality of sub-models respectively; and
determining weights of respective sub-models of the plurality of sub-models based on the processing results of the training sample data and a label of the training sample data.

13. The non-transitory computer-readable storage medium according to claim 12, wherein determining the weights of respective sub-models of the plurality of sub-models based on the processing result of the training sample data and the label of the training sample data comprises:
determining weight scores of respective sub-models based on a processing result obtained by processing the training sample data by each sub-model and the label of the training sample data; and
performing a normalization processing on the weight scores of respective sub-models to obtain the weights of respective sub-models.

14. The non-transitory computer-readable storage medium according to claim 13, wherein,
in a case where the initial content understanding model is used for determining a type of the data to be processed, and the initial content understanding model is applicable to a two-classification scenario, the weight score of each sub-model comprises a Kolmogorov-Smirnov index or an area under curve index;
in a case where the initial content understanding model is used for determining the type of the data to be processed, and the initial content understanding model is applicable to a multi-classification scenario, the weight score of each sub-model comprise an accuracy rate; or
in a case where the initial content understanding model is applicable to a regression prediction scenario, the weight score of each sub-model comprises a mean absolute error or a mean square error.

15. The non-transitory computer-readable storage medium according to claim 11, wherein the initial content understanding model is a random forest model constructed based on a random forest algorithm, the plurality of sub-models are decision trees, and the initial content understanding model is constructed by:
acquiring the sample data, and determining a depth of each decision tree and a split point corresponding to each decision tree; and
obtaining the random forest model based on the sample data, the depth of each decision tree, and the split point corresponding to each decision tree.

* * * * *